United States Patent
Dobler et al.

(10) Patent No.: US 6,662,923 B2
(45) Date of Patent: *Dec. 16, 2003

(54) PRESSURE PLATE ASSEMBLY

(75) Inventors: Johann Dobler, Werneck (DE); Klaus Gorzitzke, Gochsheim (DE); Oswald Grünewald, Ebertshausen (DE); Winfried Herterich, Wasserlosen (DE); Jürgen Kleifges, Schweinfurt (DE); Wolfgang Knauer, Königsberg (DE); Jörg Lampe, Obernkirchen (DE); Walter Lindner, Schwebheim (DE); Achim Link, Schweinfurt (DE); Gerhard Röll, Eisenheim (DE); Reinhold Weidinger, Kolitzheim (DE); Erwin Ziegler, Wasserlosen OT Gressthal (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/969,976

(22) Filed: Oct. 3, 2001

(65) Prior Publication Data

US 2002/0040837 A1 Apr. 11, 2002

(30) Foreign Application Priority Data

Oct. 7, 2000 (DE) .......................................... 100 49 652

(51) Int. Cl.⁷ ............................................. F16D 13/75
(52) U.S. Cl. ................................ 192/70.25; 192/111 A
(58) Field of Search .......................... 192/70.25, 109 R, 192/111 A (56) References Cited

U.S. PATENT DOCUMENTS

| | | | | | |
|---|---|---|---|---|---|
| 5,941,356 | A | * | 8/1999 | Weiss et al. | 192/70.25 |
| 5,984,067 | A | * | 11/1999 | Weidinger et al. | 192/70.25 |
| 6,123,180 | A | | 9/2000 | Weidinger | 192/70.25 |
| 6,202,817 | B1 | * | 3/2001 | Link et al. | 192/70.25 |
| 6,371,269 | B1 | * | 4/2002 | Weidinger | 192/70.25 |
| 2002/0040836 | A1 | * | 4/2002 | Weidinger et al. | 192/70.25 |

* cited by examiner

Primary Examiner—Richard M. Lorence
(74) Attorney, Agent, or Firm—Cohen, Pontani, Lieberman & Pavane (57) ABSTRACT

A pressure plate assembly for a friction clutch includes a housing for mounting to a flywheel; a pressure plate, held in the housing with the freedom to move in the same direction as that of a rotational axis (A); a stored-energy element; and a wear-compensating device acting in the path of force transmission between the stored-energy element and the pressure plate, where the wear-compensating device has at least one adjusting element, which can move in an adjusting direction to compensate for wear. A clearance-producing arrangement includes a gripping element provided on the pressure plate, which element comes or can be brought to rest against a blocking element (fixed in position relative to the housing arrangement upon the occurrence of wear. When the housing arrangement is being attached to the flywheel arrangement, the blocking element arrives in state in which it is able to enter into a blocking interaction with the associated gripping element.

10 Claims, 4 Drawing Sheets

PRESSURE PLATE ASSEMBLY

BACKGROUND OF THE INVENTION

1. Field of the Invention

The present invention pertains to a pressure plate assembly for a friction clutch, comprising a housing arrangement designed to be connected to a flywheel arrangement; a pressure plate mounted in the housing arrangement so that it can move axially; a stored-energy element; a wear-compensating device acting in the path of force transmission between the stored-energy element and the pressure plate, where the wear-compensating device has at least one adjusting element which can move in an adjusting direction to compensate for wear; and at least one clearance-producing arrangement, comprising a gripping element on the pressure plate, which, on the occurrence of wear, comes or can be brought to rest against a blocking element fixed in position relative to the housing arrangement.

2. Description of the Related Art

A pressure plate assembly of this type is known, for example, from U.S. Pat. No. 6,123,180. In this known pressure plate assembly, the blocking element provided to cooperate with the gripping element of the clearance-producing arrangement is screwed to the housing arrangement with threaded bolts and thus connected tightly to it. For this purpose, the housing arrangement has an elevated part with a surface which is intended to face the flywheel arrangement, on which surface a corresponding surface of the blocking element rests when the screwed connection mentioned above is made. As a result of this design, it is necessary to connect the blocking element tightly to the housing arrangement before the pressure plate and the components working together or associated with it are assembled to form the pressure plate assembly. This leads to the problem that, after the assembly comprising the housing arrangement and the blocking element and the assembly comprising the pressure plate, the wear-compensating device, and the clearance-producing arrangement have been put together, the pretensioning force provided by the stored-energy element acting between the housing arrangement and the pressure plate and the fact that the pressure plate assembly has not yet been connected to the flywheel arrangement, which means that there is no support for the pressure plate, lead to the potential danger of an interaction between the blocking element and the gripping element of the clearance-producing arrangement. Such an interaction would bring about an unwanted wear-compensating adjustment, even though no wear at all had occurred. The pressure plate assembly would thus ultimately arrive in a state in which it could no longer be attached to a flywheel arrangement to form a friction clutch. In pressure plate assemblies of this type, it is therefore a known and practiced technique to use some sort of transport securing devices to ensure that the pressure plate is held in a position shifted toward the housing arrangement. At the same time, the stored-energy element is put under tension to avoid the undesirable interaction described above between the gripping element and the blocking element. Providing transport securing devices to keep the stored-energy element in a highly pretensioned position, however, is a complicated matter, especially in view of the fact that the transport securing devices must be designed with enough strength and solidity and installed with sufficient permanence to ensure that the stored-energy element, which usually produces a comparatively large amount of force, can be held in the preloaded state noted above.

SUMMARY OF THE INVENTION

It is the object of the present invention to provide simple measures for preventing the wear-compensating device of a pressure plate assembly from making an unwanted wear-compensating adjustment before the pressure plate assembly is put together with a flywheel arrangement.

According to the invention, when the housing arrangement is connected to the flywheel arrangement, the blocking element arrives in a state in which it is able to enter into a blocking interaction with the associated gripping elements.

Because the process of putting together the housing arrangement and the flywheel arrangement of the pressure plate assembly according to the invention brings the blocking element necessarily into the final position intended for it and thus into the position in which it is able to act as a blocker, the assembly process is greatly simplified, and at the same time it is ensured that the blocking element is kept in a passive state before this assembly process is carried out, which means that it is impossible for an undesirable adjusting movement of the wear-compensating device to occur. With a pressure plate assembly according to the invention, therefore, there is no need to take complicated transport-securing measures to ensure that the pressure plate is pulled back far enough into the housing arrangement against the very highly pretensioned state of the stored-energy element. With the blocking element already in its final position relative to the housing arrangement, the previously explained blocking interaction between the blocking element and the gripping element cannot occur in the secured-for-transport state.

In the pressure plate assembly according to the invention, a support element, for example, can be provided, by means of which the blocking element is supported on the housing arrangement in such a way that, before the pressure plate assembly is connected to the flywheel arrangement, the blocking element is kept in a state in which it is unable to enter into a blocking interaction with the associated gripping element. It can also be provided that the blocking element is carried by the support element in an area near the edge of the housing arrangement which is to be positioned in contact with the flywheel arrangement.

So that the blocking element can easily make the transition to the state in which it is able to interact, it is proposed that it be possible for the support element with the blocking element mounted on it to shift approximately in the same direction as that of the rotational axis during the process in which the housing arrangement is connected to the flywheel arrangement.

The design of the pressure plate assembly according to the invention can be simplified even more by allowing the blocking element to be held in position by the clamping action between the housing arrangement and the flywheel arrangement after the housing arrangement has been connected to the flywheel arrangement, because no additional components are then required to hold the blocking element in position.

In an alternative design, it can be provided that the support element is connected detachably to the blocking element on one side and also to the housing arrangement on the other side, and that the support element holds the blocking element in a predetermined position relative to the housing arrangement, which position, however, can be changed by the action of a force exerted during the process of connecting the housing arrangement to the flywheel arrangement. Because the support element is also connected detachably to the blocking element and thus can be removed after the pressure plate assembly has been connected to the flywheel arrangement, the danger that a support element of this type could cause the flywheel arrangement or the friction clutch attached to it to become out of balance is eliminated. In a design of this type, furthermore, it is possible to provide a displacement element, which, as the housing arrangement is being connected to the flywheel arrangement, moves the blocking element into a position where it can function as a blocker. It is possible for the displacement element to be permanently connected to the blocking element, and it can be provided with a contact area with which it cooperates with the flywheel arrangement to displace the blocking element.

So that the blocking element can be held securely in a defined position in the completely assembled state as well, it is proposed that, after the housing arrangement has been connected to the flywheel arrangement, a fastening bolt be inserted through the blocking element and the displacement element, and that the blocking element be clamped together with the displacement element between the housing arrangement and the flywheel arrangement.

The invention also pertains to a friction clutch which has a pressure plate assembly according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The pressure plate assembly 10 shown in FIGS. 1 and 2 comprises a housing 12, which can be attached to a flywheel arrangement, e.g., a one-piece flywheel or possibly a multiple-mass flywheel, by means of a plurality of threaded bolts 14 in a manner to be described further below. The threaded bolts 14 pass through holes 17 in a section 15 of the housing arrangement extending approximately in the radial direction. Inside the housing 12, a pressure plate 16 is provided, the friction surface 18 of which can be pressed against a clutch disk (not shown), the clutch disk then being pressed in turn against a corresponding friction surface of the flywheel arrangement. The pressure plate 16 is connected to the housing 12 by suitable elements (not shown) such as tangential leaf springs or the like, so that it is free to move in the same direction as the rotational axis A but is essentially unable to rotate around the rotational axis A relative to the housing 12.

A stored-energy element 20 is also provided in the housing 12. The radially outer area 22 of this element is supported against the housing 12, whereas its radially inner area, where so-called "spring tongues" 24 are located, is designed to be actuated by a release mechanism of the pull type. The radially intermediate area acts on the pressure plate 16 by way of a wear-compensating device 26, which will be described further below. It should be pointed out that the illustrations of the stored-energy element 20 and of the pressure plate assembly 10 of the pull type are only intended as examples. It is obvious that the stored-energy element 20 could also be supported on the housing 12 at a point radially inside the area where it acts on the pressure plate 16 by way of the wear-compensating device 26 and thus be designed for actuation by a release mechanism of the push type. In the exemplary embodiment shown here, the wear-compensating device 26 comprises adjusting rings 28, 30. The adjusting ring 28 is supported on the pressure plate 16, and the adjusting ring 30 accepts the actuating force of the stored-energy element, i.e., of the diaphragm spring 20. The surfaces of the two adjusting rings 28, 30 which rest against each other have complementary slanted or wedge-type surface areas, which are designed with a wedge-like profile extending in the circumferential direction. The relative rotation of the two adjusting rings 28, 30 with respect to each other therefore has the result of changing the total axial dimension of the wear-compensating device 26. A spiral tension spring 32 installed radially inside the adjusting rings 28, 30 keeps the two adjusting rings 28, 30 under pretension for rotational movement with respect to each other. One end of the spring 32 acts on the adjusting ring 28, whereas the other end is connected to, for example, the pressure plate 16.

A gripping element 34 of a clearance-producing arrangement 36 is also provided on the pressure plate 16, radially inside the adjusting rings 28, 30. One circumferential end 38 of the gripping element 34 is fastened by a threaded bolt 40 to the pressure plate 16, whereas at its other circumferential end 42, the gripping element 34 has a gripping section 46, which extends radially outward through a circumferential and axial slot 44 in the adjusting ring 30. The gripping element 34 is made of resilient material such as spring plate and is pretensioned in its mounted position in such a way that it acts in the axial direction on the adjusting ring 30 and thus on the entire wear-compensating device 26. As a result of this pretensioning effect, the two adjusting rings 28, 30 are clamped between the gripping section 46 and the pressure plate 16, so that even the pretensioning force of the spring 32 is unable to cause the adjusting rings 28, 30 to rotate with respect to each other in a direction such that the total axial dimension of the wear-compensating device 26 increases.

At its free end 48, the gripping section 46 of the gripping element 34 extends over a blocking element 52, which is fixed in position relative to the housing 12 and extends radially inward up as far as the adjusting rings 28, 30. As can be seen especially clearly in FIG. 1, there is therefore a radial overlap between the end 48 and the corresponding end 54 of the blocking element 52.

An arresting element 56 is also associated with the gripping element 34 of the clearance-producing arrangement 36. This arresting element 56 is located radially inside the adjusting rings 28, 30, i.e., it rests against their inside circumferential surfaces and is guided in a corresponding recess 58 in the pressure plate 16, in which the adjusting ring 28 resting against this pressure plate 16 is also guided. A second spiral tension spring 62 acts on the circumferential end 60 of the arresting element 56; the other end of this spring is attached or hooked to the spiral tension spring 32, namely, to the end of this spring which cooperates with the adjusting ring 28, which can rotate in the circumferential direction around the rotational axis A, as will be described below. Adjusting ring 30 is blocked by the gripping element 34, i.e., by the gripping section 46 engaging in the slot 44, and is thus essentially unable to rotate in the circumferential direction.

Figure 1:
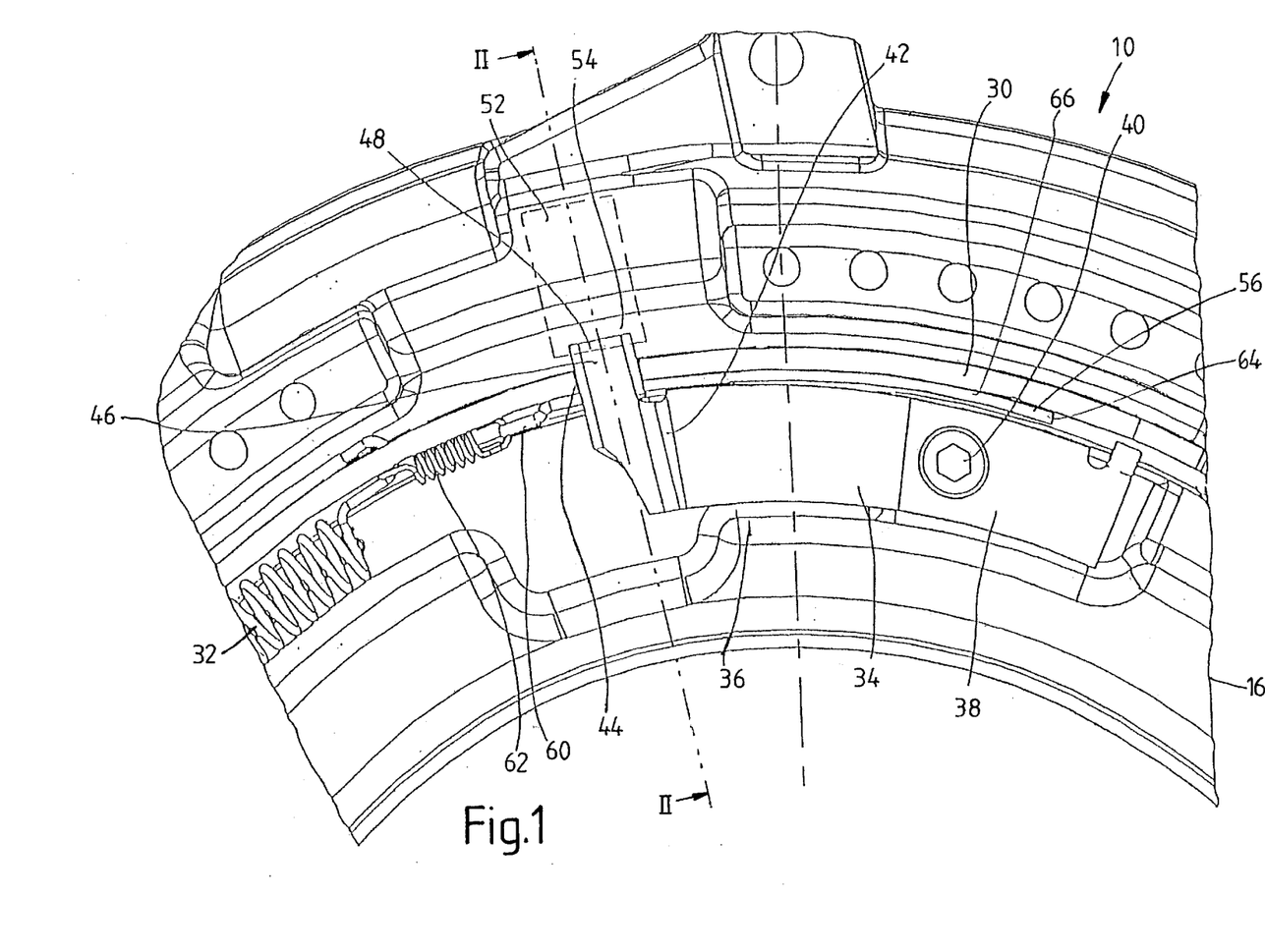
FIG. 1 is a partial axial view of a pressure plate assembly according to the invention.

The axial dimension of the arresting element 56 increases from its one end 60 to its free end 64; that is, it is designed with a wedge-like shape in the circumferential direction between its ends 60, 64 in such a way that the smallest axial dimension is present in the area where the gripping section 46 is positioned above the arresting element 56 as shown in FIG. 1 and the greatest axial dimension is present in the area next to the end 64. As a result of the action of the spring 62, the arresting element 56 is thus pretensioned in the circumferential direction and pulled along until its surface 66 with a wedge-like shape strikes the gripping section 46 of the gripping element 34 and is thus prevented from moving any farther in the circumferential direction.

The way in which the pressure plate assembly 10 functions in rotational operating mode, especially when wear occurs, is described in the following.

In the new, as yet unworn state of the friction linings normally provided on the clutch disk, the two adjusting rings 28, 30 assume a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension.

In this state, then, as already described, the adjusting rings 28, 30 are arrested with respect to each other by the pretensioning effect of the gripping element 34 and thus unable to rotate. In the engaged state, furthermore, the stored-energy element 20 is acting on the adjusting ring 30, with the result that the pressure plate 16, which in this situation is resting against the clutch disk, and the resulting opposing force provide another blocking effect on the two adjusting rings 28, 30, which also prevents them from moving. The blocking effect provided by the stored-energy element 20 is much stronger, however, because the stored-energy element 20 exerts a force much greater than the pretensioning force of the gripping element 34.

In this new state of the pressure plate assembly 10, it is also possible for the end section 48 of the gripping section 46 to be a certain axial distance away from the opposing end section 54 of the blocking element 52.

Figure 2:
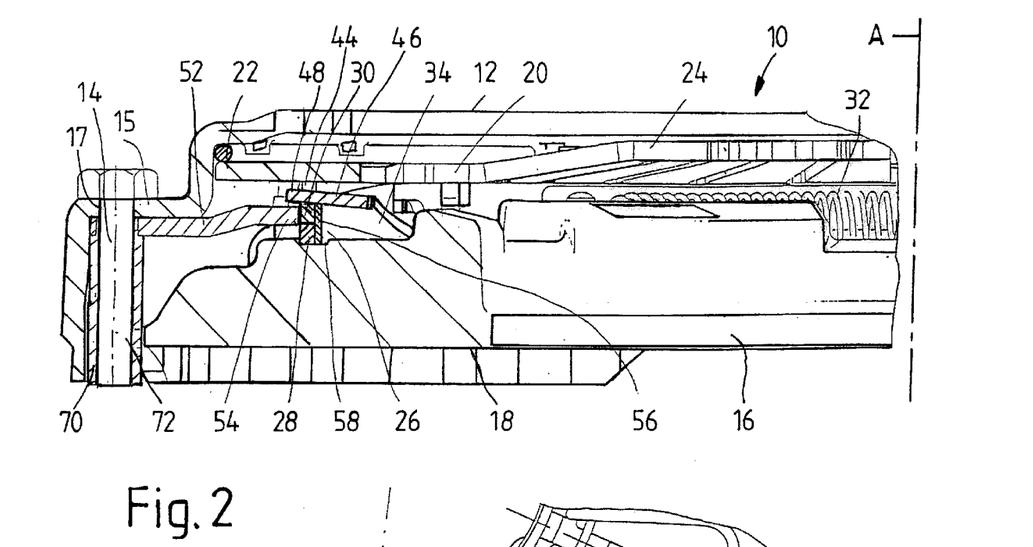
FIG. 2 is a sectional view of the pressure plate assembly according to the invention along line II—II of FIG. 1.

When now the friction linings become worn during operation, e.g., after repeated engagements and disengagements, the pressure plate 16 comes closer and closer to the flywheel arrangement when in the engaged state, which, in the illustration of FIG. 2, corresponds to a movement of the pressure plate 16 in the downward direction relative to the housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the adjusting ring 30 as the pressure plate 16 continues to move in the axial direction. A certain amount of axial clearance is thus created between the gripping section 46, which had previously been resting against the adjusting ring 30, and this adjusting ring 30. Because the stored-energy element storage 20 is still exerting its force on the adjusting rings 28, 30 during the clutch-engaging process and then in the engaged state, as described above, it is still impossible for any relative rotational motion to occur between the two adjusting rings 28, 30, even though the gripping element 34 is no longer exerting any blocking action. In the state in which the further movement of the gripping section 46 is blocked, the gripping section 46 would then in principle be forced to lose contact with the wedge surface 66 of the arresting element 56. But because this arresting element 56 is under the pretension of the spring 62, this element is pulled into the gap which forms as soon as the rising movement of the gripping section 46 begins. The result of this is that, when a clutch-disengaging operation now occurs, in the course of which the end section 48 of the gripping section 46 rises axially again from the blocking element 52, the gripping section 46 is unable to make contact again with the wear-compensating device 26, which is still being prevented by the stored-energy element 20 from making an adjusting movement. Initially, therefore, at the beginning of the disengaging process, the play between the gripping section 46 and the adjusting ring 30 previously produced by wear remains.

During a subsequent clutch-disengaging process, however, the clamping action of the two adjusting rings 28, 30 relative to each other essentially disappears as a result of the elimination or reduction of the actuating force of the stored-energy element 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the spiral tension spring 32; the adjusting ring 30 is prevented from moving in the circumferential direction by the gripping element 34. During this relative rotation between the two adjusting rings 28, 30 and the accompanying sliding movement of the various slanted surface areas along each other, the wear-compensating device 26 changes its axial dimension until the adjusting ring 30 comes to rest again against the gripping section 46. The axial dimension of the wear-compensating device 26 has thus been changed essentially to the same extent as that to which the gripping section 46 was previously raised from the adjusting ring 30, this distance corresponding in turn essentially to the extent to which the pressure plate 16 has moved closer, as a result of wear, to the flywheel arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy element 20 acts on the wear-compensating device 26 has been increased to the same extent that the thickness of the friction lining has decreased. The installation position of the stored-energy element therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process—the arresting element 56 being held stationary at this time, so that, when more wear occurs, essentially the same amount of pretensioning force is still available to the arresting device for movement in the circumferential direction.

It should be pointed out that, in principle, the design of the pressure plate assembly with wear compensation which has been described above can be modified in a wide variety of ways. For example, it is possible for the wear-compensating device 26 to have only a single adjusting ring, which, when wear occurs and a compensation process is being performed, can move in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual wedge elements, which are actuated by associated spring arrangements and which cooperate with separate gripping elements, could also be provided.

Figure 3:
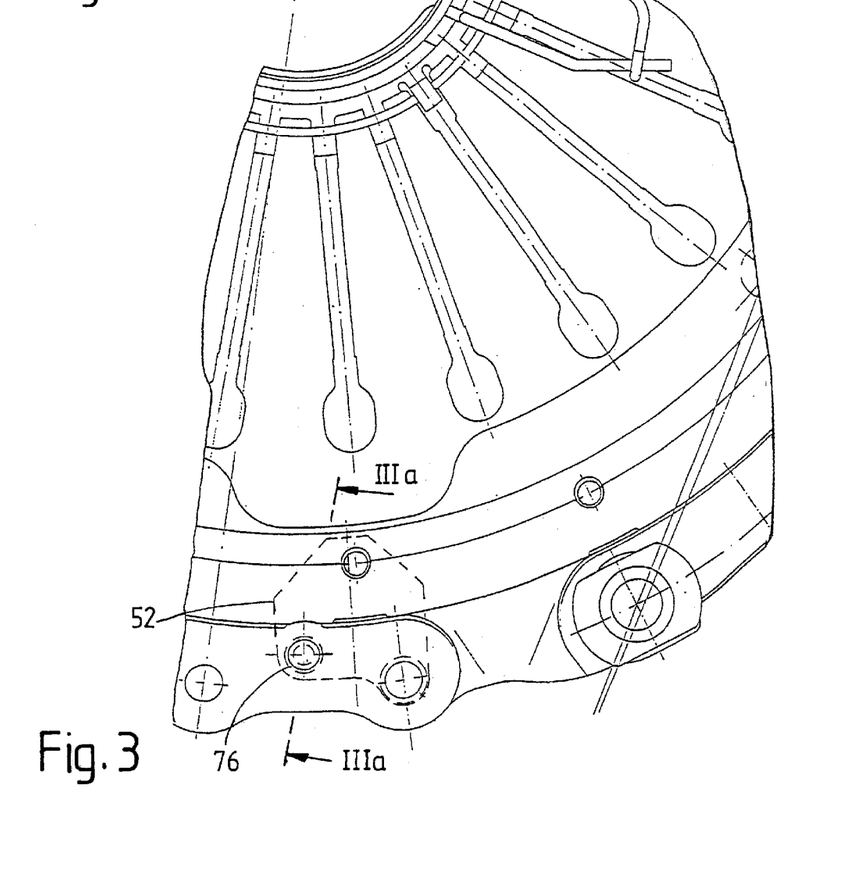
FIG. 3 is a partial axial view of the pressure plate assembly according to the invention.
Figure 3A:
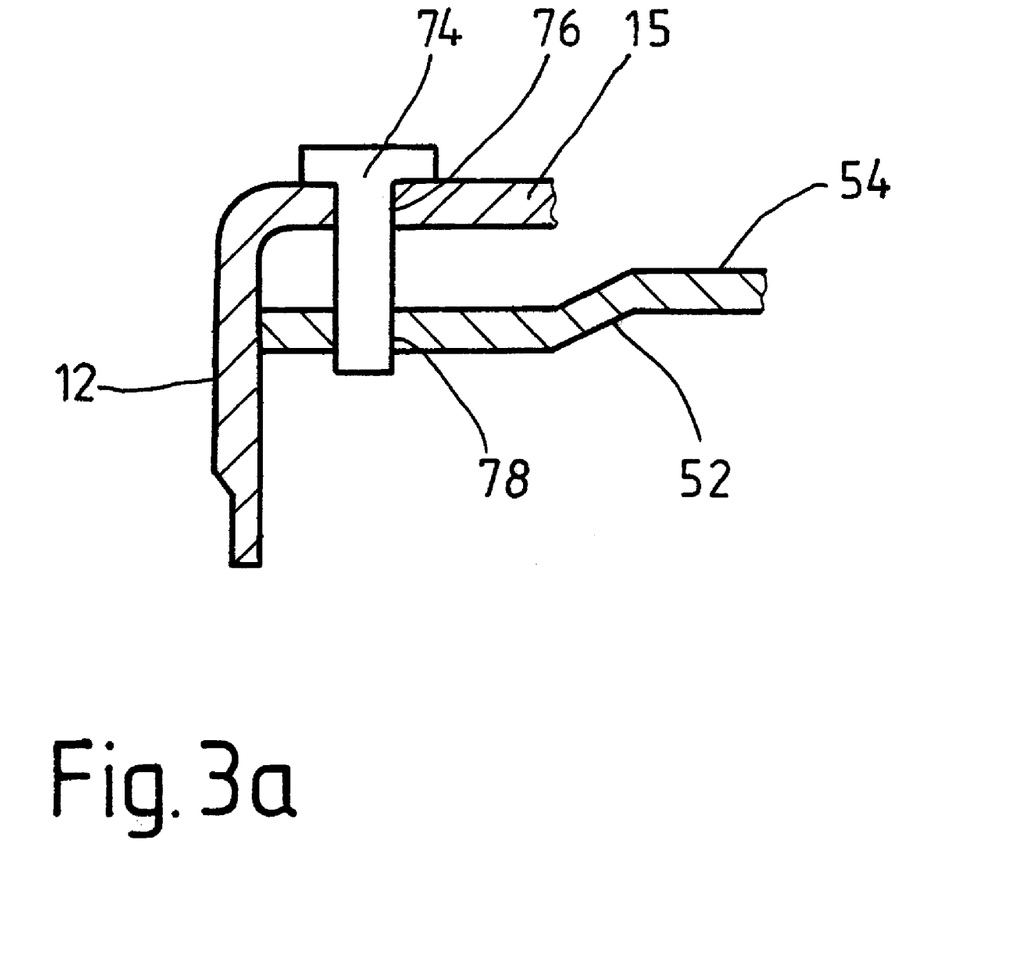
FIG. 3a is a partial longitudinal section along line IIIa—IIIa of FIG. 3.

In the pressure plate assembly 10 according to the invention, measures are provided to ensure that, before the pressure plate assembly 10 is connected to a flywheel arrangement, the blocking element 52 cannot interact with the gripping section 46 of the gripping element 34. It can be seen in FIG. 2 that the blocking element 52 is permanently connected at its radially outer area to a displacement sleeve 70 by a press fit, etc. The displacement sleeve 70 has a central opening 72, through which one of the threaded bolts 14 is inserted. FIG. 3a shows a secured-for-transport or preassembly state. In this state, the blocking element 52 is axially offset with respect to the housing 12, i.e., with respect to section 15 of the housing. That is, the blocking element is shifted axially toward the open side, provided for connection to the flywheel arrangement. As a result of this axial shift, the blocking element 52 is also moved away from the gripping element 34 in the axial direction to such an extent that, even as a result of the pretension exerted by the stored-energy element and the axial displacement of the pressure plate 16, i.e., of the gripping element 34, which could occur as a result of the movement of the pressure plate, it is impossible for any blocking interaction to occur between the gripping element 34 and the blocking element 52.

To arrive at this position or location of the blocking element 52, a support element 74 is provided, which can consist of, for example, a component made of plastic. The support element 74 passes through the hole 76 in section 15 of the housing 12 in such a way that it is held there with a light press-fit and thus is held with a certain clamping force in the housing 12 in the position shown in FIG. 3. The support element 74 also projects through a hole 78 in the blocking element 52 and is also held in this hole with a light press-fit. As a result of the press-fits both in the hole 76 and in the hole 78, it is ensured that, before the pressure plate assembly 10 is put together with the flywheel arrangement, the blocking element 52 cannot rest against the gripping element 34 or lift the gripping element 34 from the wear-compensating device in such a way that an unwanted adjusting movement could occur. In addition, the blocking element 52, with the displacement sleeve 70 attached to it, is positioned in such a way that a threaded bolt 14, not initially present in the secured-for-transport state, can be inserted in a straight line through the hole 17 in the housing 12 and then through the central hole 72 of the displacement sleeve to fasten the pressure plate assembly 10 to a flywheel arrangement.

When the pressure plate assembly 10 is connected to a flywheel arrangement, the first thing that happens is that the end of the displacement sleeve 70 facing the flywheel arrangement comes to rest against this flywheel arrangement, so that, as the housing 12 approaches the flywheel arrangement in the axial direction, the displacement sleeve 70 is stopped by the flywheel arrangement. As a result of this blocking action, the displacement sleeve 70 and therefore the blocking element 52 attached to it are both displaced relative to the housing 12. In a state in which the housing 12 has reached its final axial position with respect to the flywheel arrangement, the displacement sleeve 70 and the blocking element 52 are in the position with respect to the housing 12 shown in FIG. 2. After the threaded bolt 14, which passes through the displacement sleeve 70 and through a corresponding hole in the blocking element, has been inserted and tightened, a clamping effect can be obtained, so that the blocking element 52 is held ultimately in a fixed position relative to the housing 12. In this state, the displacement sleeve 70 can continue to exercise its function as a spacer to achieve a defined axial position between the flywheel arrangement and the housing 12. In principle, however, it would also be possible to provide additional axial stop elements for the flywheel arrangement on the housing arrangement 12. In the fully assembled state shown in FIG. 2, therefore, the radially outer area of the blocking element 52 rests solidly against the inside surface of the section 15 of the housing 12 and is pressed firmly against the housing 12 by the force produced by the displacement sleeve 70, which is braced against the flywheel arrangement.

After the housing has been fixed permanently to the flywheel arrangement, the support element 70 can then be pulled out, so that it doesn't impair the balance of the assembly.

Figure 4:
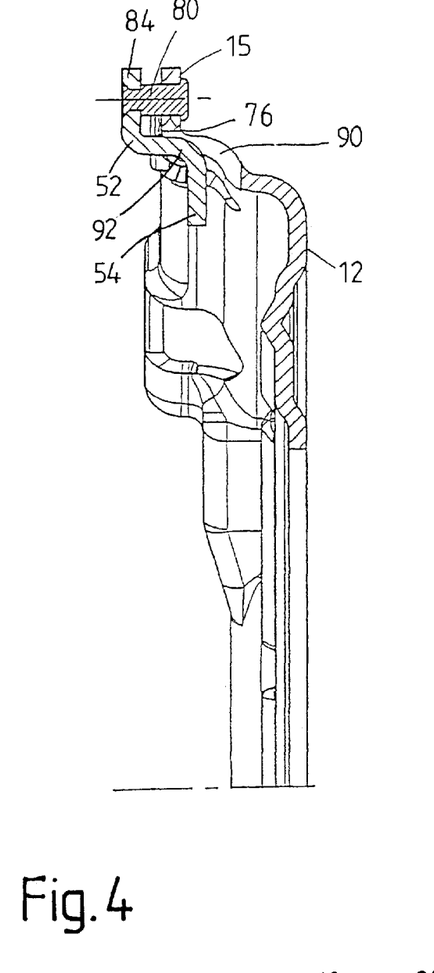
FIG. 4 is a partial longitudinal section of a housing arrangement of an alternative embodiment of the pressure plate assembly according to the invention.
Figure 5:
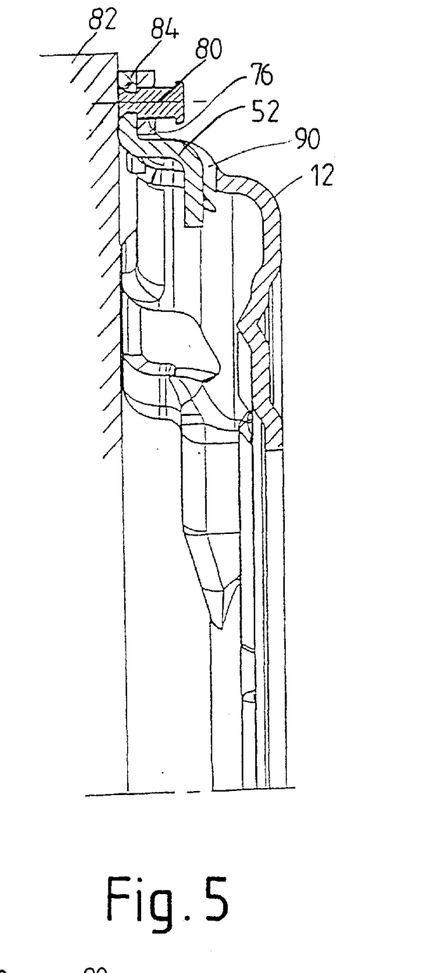
FIG. 5 is a view similar to that of FIG. 4 in which the housing arrangement is shown attached to the flywheel arrangement.
Figure 6:
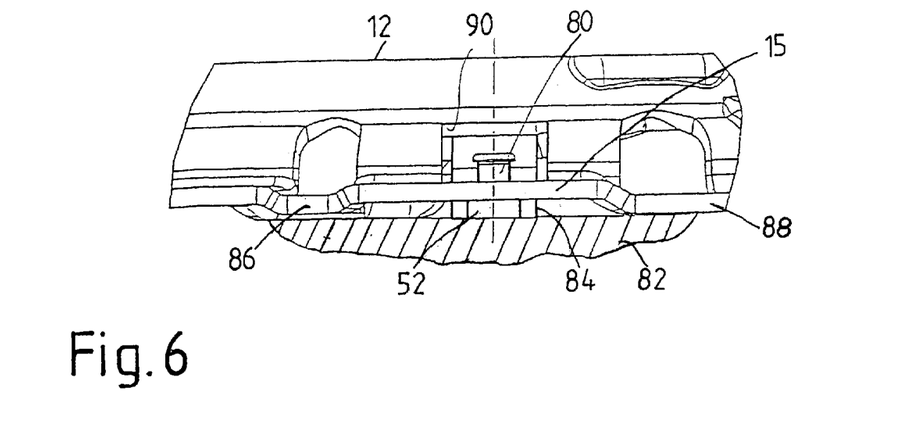
FIG. 6 is a view of the housing arrangement and the flywheel arrangement of FIG. 5 looking radially inward from the outside.

FIGS. 4–6 show an alternative design of the pressure plate assembly according to the invention, pertaining especially to the attachment of the blocking element 52. It can be seen in FIG. 4 that the radially outer area of the blocking element 52, with an angled contour, is connected to a support element 80 by means of a rivet-like press-fit, for example. The support element 80 extends approximately in the axial direction and passes again through a hole 76 in an approximately radially oriented section 15 of the housing 12. This flange-like section 15 of the housing is now provided in the area which is to be positioned in contact with or near the flywheel arrangement 82 shown in FIG. 5. The support element 80 in this design is held in the hole 76 with some clearance and thus allows the assembly formed by the support element 80 and the blocking element 52 to move with a certain freedom in the axial direction. In the secured-for-transport state shown in FIG. 4, it is again impossible for any blocking interaction to occur between the blocking element 52 and the gripping element (not shown in FIGS. 4–6) because of the absence of a tight connection between the blocking element 52 and the housing 12 and the resulting possibility of the axial displacement of the blocking element 52, as was also the case in the example described previously.

When the housing 12, i.e., the pressure plate assembly including the housing, moves toward the flywheel arrangement 82, the radially outer area of the blocking element 52 closest to the flywheel arrangement 82 comes to rest against the flywheel arrangement 82. As the axial movement of the housing 12 continues, the support element 80 then starts to move through the hole 76 until ultimately, in the final assembly position, which can be seen in FIGS. 5 and 6, the radially outer area 84 of the blocking element 52 comes to rest against the axial surface of the section 15 of the housing 12 and also rests against the opposing axial surface of the flywheel arrangement 82 and ultimately is firmly clamped between these two surface areas. By tightening the threaded bolts in the sections surrounding the area shown in FIGS. 4 and 5 in the circumferential direction, ultimately an axial clamping effect is produced which takes care of positioning and holding the blocking element 52 firmly in place relative to the housing 12, where here in addition, as a result of the engagement of the support element 80 in the hole 76, a positive, form-locking connection is obtained between the blocking element 52 and the housing 12 in both the radial and the circumferential directions.

It can be seen in the final assembled state illustrated in FIG. 6 that the section 15 of the housing 12, in which the support element 18 is positioned, is offset in the axial direction relative to the adjacent areas 86, 88 toward the flywheel arrangement 82, so that ultimately the space is created to hold the radially outer area 84 of the blocking element 52.

To arrive at a configuration which is as compact as possible, furthermore, a cutout or hole 90 is provided in the housing 12 for the blocking element 52, in which hole the blocking element 52 fits to some extent even in the secured-for-transport state. In particular, an angled or transition area 92, which ultimately connects the radially inner area 54 to the radially outer area 84, is situated in this hole or cutout 90 in the final assembled state, as shown in FIGS. 5 and 6.

The present invention proposes measures which make it possible for a blocking element to be present on a pressure plate assembly even while the various components are being assembled, this blocking element being in a state, however, in which it is as yet unable to perform its blocking function. Upon attachment of the pressure plate assembly to the flywheel arrangement, the blocking element is pushed into the position in which is able to exercise its blocking function, this being done in a positive manner and without any additional actuating measures. Thus, no procedure for attaching the blocking element afterwards is required, which procedure would ultimately have to be performed either just prior to the attachment of the pressure plate to the flywheel arrangement or, given an appropriate design, after the attachment of the pressure plate assembly to a flywheel arrangement, insofar as this would be possible for design reasons. Nevertheless, there is no danger that any undesirable or unsuitable effects can occur on the wear-compensating device in the secured-for-transport state, not even when the pressure plate and the housing arrangement are being held together essentially only by the tangential leaf springs or similar assemblies and not even when the only type of transport securing device provided is one which, while exerting only a small amount of force on the stored-energy element, merely relieves the tangential leaf springs of load.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch, comprising
    a housing for mounting to a flywheel having an axis of rotation,
    a pressure plate mounted in said housing with freedom to move axially,
    a stored energy element mounted in said housing and transmitting force along a path to said pressure plate to load said pressure plate toward said flywheel,
    a wear-compensating device in the path of force transmission between the stored energy element and the pressure plate, said wear-compensating device comprising at least one adjusting element which is movable in an adjusting direction to compensate for wear,
    a blocking element which is fixed in position relative to said housing,
    a gripping element fixed to said pressure plate, said gripping element blocking said at least one adjusting element against movement in said adjusting direction before wear occurs, said gripping element coming into contact with said blocking element when wear occurs, and
    means for positioning said blocking element with respect to said housing so that, when said housing is mounted to said flywheel, said blocking element can come into contact with said gripping element.

2. A pressure plate assembly as in claim 1 wherein said means for positioning said blocking element comprises a support element which supports said blocking element on said housing so that, before said housing is mounted to said flywheel, said blocking element cannot come into contact with said gripping element.

3. A pressure plate assembly as in claim 2 wherein said housing has an edge which is to be mounted in contact with the flywheel, said support element supporting said blocking element at said edge.

4. A pressure plate assembly as in claim 3 wherein said support element is movable together with said housing element in substantially the same direction as that of said rotational axis while the housing is being mounted to the flywheel.

5. A pressure plate as in claim 3 wherein said blocking element is clamped firmly between said housing and said flywheel after said housing is mounted to said flywheel.

6. A pressure plate assembly as in claim 2 wherein said support element is detachably connected to said blocking element and holds said blocking element in a predetermined position relative to said housing, which position can be changed by exerting a force while said housing is being mounted to said flywheel.

7. A pressure plate assembly as in claim 6 further comprising a displacement element which shifts said blocking element into contact with said gripping element when said housing is mounted to said flywheel.

8. A pressure plate assembly as in claim 7 wherein said displacement element is fixed to said blocking element, said displacement element contacting said flywheel to shift said blocking element into contact with said gripping element when said housing is mounted to said flywheel.

9. A pressure plate assembly as in claim 7 further comprising a fastening bolt which is received through said blocking element and said displacement element to fix said housing to said flywheel, said blocking element and said displacement element being clamped between said housing and said flywheel when said housing is mounted to said flywheel.

10. A friction clutch comprising a pressure plate assembly, said pressure plate assembly comprising a housing for mounting to a flywheel having an axis of rotation,
  a pressure plate mounted in said housing with freedom to move axially,
  a stored energy element mounted in said housing and transmitting force along a path to said pressure plate to load said pressure plate toward said flywheel,
  a wear-compensating device in the path of force transmission between the stored energy element and the pressure plate, said wear-compensating device comprising at least one adjusting element which is movable in an adjusting direction to compensate for wear,
  a blocking element which is fixed in position relative to said housing,
  a gripping element fixed to said pressure plate, said gripping element blocking said at least one adjusting element against movement in said adjusting direction before wear occurs, said gripping element coming into contact with said blocking element when wear occurs, and
  means for positioning said blocking element with respect to said housing so that, when said housing is mounted to said flywheel, said blocking element can come into contact with said gripping element.

* * * * *